Figure 1:
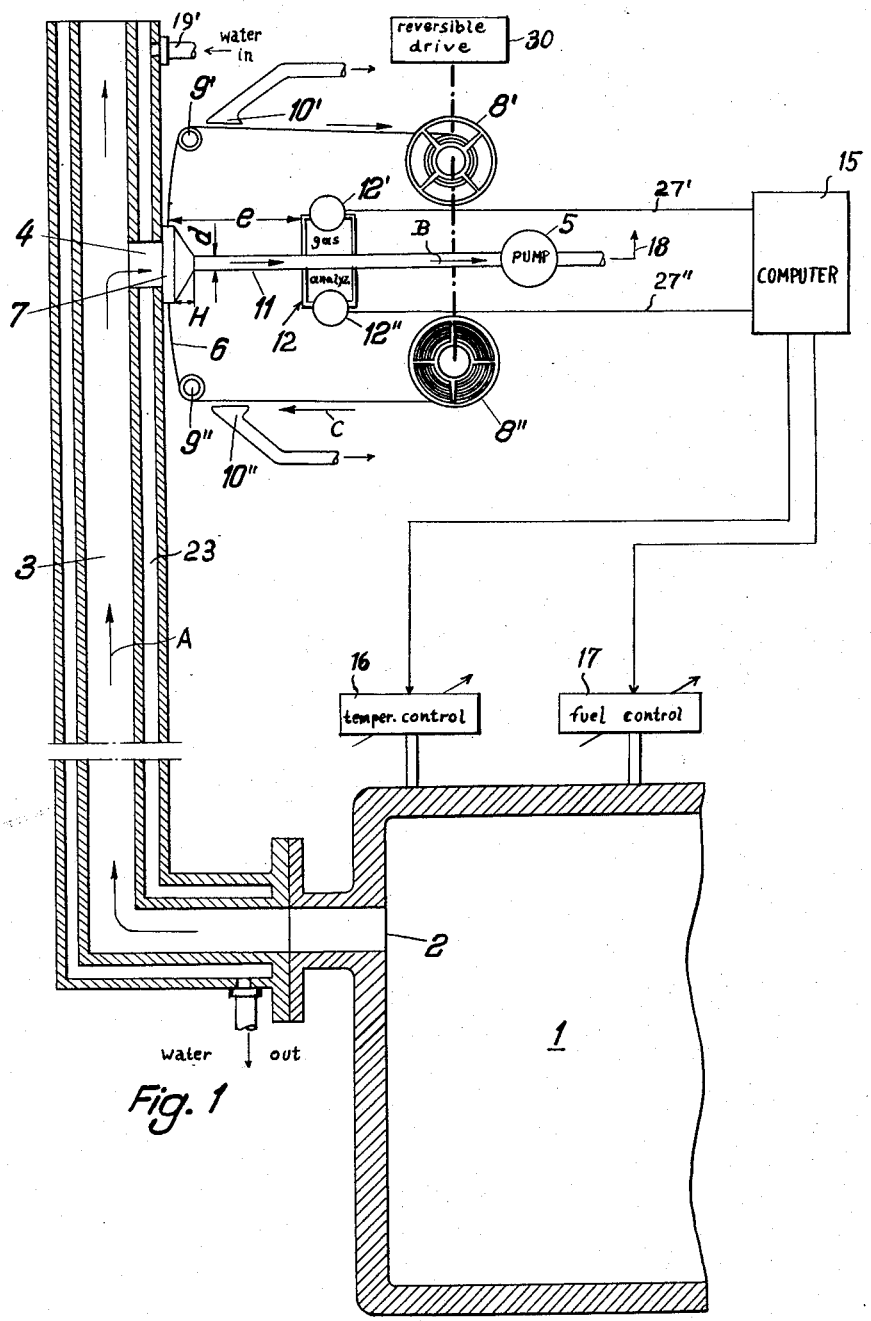

United States Patent Office 2,901,626
Patented Aug. 25, 1959

2,901,626

APPARATUS FOR THE ANALYSIS OF HOT, DUST-LADEN GASES

Helmut Becker, Oberhausen-Osterfeld, Germany, assignor to Hüttenwerk Oberhausen A.G., Oberhausen, Rhineland, Germany, a corporation of Germany Application April 29, 1958, Serial No. 731,839

Claims priority, application Germany May 27, 1957

10 Claims. (Cl. 250—43.5)

This invention relates to an apparatus for the analysis of hot gases, e.g. by spectro-photometric means, used to observe or to control the operation of a plant (such as a boiler or a steel-making furnace) producing such gases.

In many instances, where an industrial process gives rise to gaseous products, the analysis of such gases not only enables convenient determination of the progress of the reaction processes but, more important for uniform results and maximum efficiency, permits continuous and automatic control of this process. Such control is dependent on the extremely rapid restoration of process variables to their rated values, i.e. on the virtually instantaneous correction of the deviations in these variables so as to avoid objectionable hunting. To achieve this rapid correction, the results of the exit-gas analysis must be available to the automatic control mechanism (or to the operator) in the shortest possible time. In practical terms, this means that the sampling, analysis, and communication of results must occur within one to two seconds so that the process does not deviate excessively from its optimum path.

The time required for the actual analysis of the exit gases and the communication of the results to a controller presents no serious problem, for gas analyzers are available that can perform these tasks within about half a second. But the duration of the sampling period, that is, the time measured from the instant that the composition of the gaseous mixture changes in the reaction vessel until a representative sample of this changed composition reaches the analyzer, has been the chief stumbling block to really rapid analysis, and so also to good process control, particularly because of the relatively long path the sample must travel from its point of origin in the reaction chamber to the analyzer. Actually, this relatively long path is unavoidable in conventional analytical systems if the sample of the hot gaseous mixture is to be cooled to the operative temperature of the analyzer, which is generally somewhat less than 40° C.; and in no such apparatus has it therefore been possible sufficiently to cool the sample, to remove its dust and soot particles, and to have it enter the analyzer within the required short period of, say, 1 to 1.5 seconds.

Attempts have been made to reduce the sampling time and to remove the particles by increasing the velocity of the exit-gas stream and inserting a filter at a suitable point in the gas stream before it reaches the analyzer. The results have proved unsatisfactory because with increased velocity the flow of the gaseous mass per unit time is also increased, resulting in a relatively larger quantity of heat that must be dissipated in a shorter time; also the filter rapidly becomes clogged with dust particles and must be changed quite often, since the concentration of particles in a unit volume of the sample passing the filter in unit time is proportional to the increased velocity of the exit-gas stream. This means that the analysis must be interrupted frequently in order to permit insertion of fresh filters, so that continuous, automatic control of the process is not feasible even when the gas-stream velocity is moderate.

The principal object of the invention is to provide an apparatus for the analysis of exit gases enabling effective automatic control of the process producing these gases.

A related object of the invention is the provision of an apparatus for the analysis of exit gases by means of which it is possible appreciably to reduce the time required to sample such gases.

A further object of the invention is to provide novel and more efficient means for the removal of particulate matter from gases, specifically exit gases.

A more specific object of the invention is to provide means permitting an appreciable shortening of the path over which the gaseous sample must travel, in comparison with other apparatus of this type.

A principal feature of the invention is that particles are removed from the exit-gas stream by a continuously moving filter arranged to pass a purifying stage, such as a dust aspirator of the vacuum-cleaner type, upon leaving the gas stream, the filter being thus re-usable an indefinite number of times. Advantageously, the filter is interposed in a widened part of the gas-sample path so as to encounter a reduced concentration of entrained impurities per unit. The sample itself may be delivered to the filter, according to another feature of the invention, through a duct having liquid-cooled walls.

Figure 2:
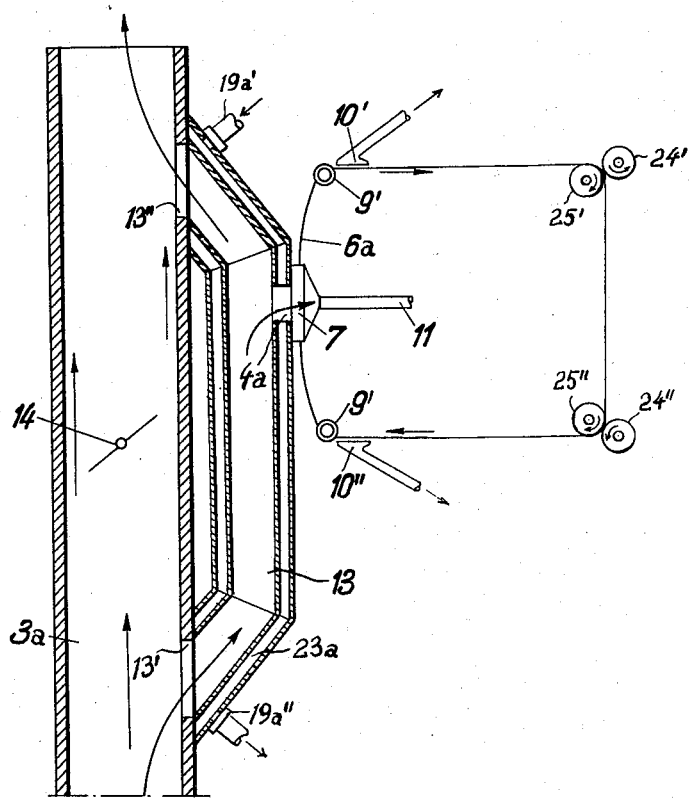

By way of more detailed description, reference is made to the accompanying drawing in which:

Fig. 1 is a somewhat diagrammatic view, partly in sectional elevation, of an analyzer and control system embodying the invention; and Fig. 2 is a similar view of a modified form of system embodying the invention.

As shown in Fig. 1, the reaction chamber 1, in which gaseous products arise in the course of the process, is connected by a short passage 2 to the flue pipe 3. The latter is vertically positioned and double-walled, so that an annular space 23 is available for the circulation of water for cooling the exist gases during their upward passage (as indicated by the arrows A) to the atmosphere. The entrance and exit ports for the water have been shown at 19' and 19", respectively. A portion of the cooled gases reaches an opening 4 in the wall of the flue pipe 3, where a representative sample is continuously drawn past the moving filter 6 with the aid of a slight vacuum of constant magnitude induced by a suction pump 5 at the funnel-shaped hood 7 forming the entrance of a laterally extending transmission pipe 11. By the time the gas sample enters the opening 4, its temperature has been reduced by the cooling fluid in water jacket 23 to preferably less than 40° C. so that neither the retentivity of the filter medium nor the operation of the analyzer 12, which straddles the passage 11, is impaired by excessive heat. Also since the gas stream ascending in the flue pipe 3 is always under positive pressure due to its elevated temperature, there is no danger of external gases from the atmosphere contaminating the sample.

The filter, which can be made of cloth, paper, or other material whose average pore size is such that it will retain the smallest dust or soot particles in the exit-gas stream, is in the form of a continuously moving ribbon 6 which retains such particles while constantly presenting a fresh filter surface to the incoming sample gas stream so that clogging cannot occur. As the portion of the filter ribbon bearing the dust particles moves away from the hood 7 in the direction of the arrows B, it is guided by rollers 9, and 9" so that it reaches the nozzle 10' of a dust aspirator connected to a suitable exhaust system not shown. The so regenerated filter ribbon 6 is finally wound up on a spool 8' driven, together with ribbon-supply reel 8″, from a reversible motor 30. A suitable limit switch not shown, actuated by a projection on either extremity of the ribbon, automatically reverses the direction of travel (in a manner comparable to the operation of the ribbon-winding mechanisms of typewriters) when the bulk of the filter ribbon has been wound onto spool 8′ or 8″. With the ribbon 6 moving in the reverse direction (i.e. opposite to that indicated by the arrows C), the dust particles are removed by a second aspirator nozzle 10″. The filter ribbon thus moves continually, winding and rewinding from spool to spool, at a velocity which is preferably variable in accordance with the concentration of dust particles in the exit gas by suitable adjustment of the driving motor 30.

The relative dimensioning of the cross-sectional areas of the gas passages 4, 7 and 11 shown in the drawing affords the greatest possible filtering surface for the gas sample. Thus, the area of that portion of the filter ribbon which, at any instant, is in the path of the particle-laden gas sample (and which corresponds to the area of inlet port 4) should be as large as possible in relation to the cross-sectional area of the conduit 11 leading to the analyzer. For example, the ratio of these respective areas may be of the order of 30 to 1 or 20 to 1. Also, it should be noted, the height H of the conical section of the hood 7 should be equal to or only slightly greater than the diameter d of the transmission pipe 11.

Since the filter is always in motion, the particle layers cannot build up in any one place and the light deposits are readily removed by the suction nozzles 10′ and 10″.

The gas sample, free from dust and other particles after passing the filter ribbon 6, continues through transmission pipe 11 to the analyzer 12, which may be an infrared spectrophotometer or a similar instrument. The results of the analysis are transmitted by means of a suitable circuit 27′, 27″, shown schematically, to a computer 15 which, in turn, sends corrective impulses to one or more governors 16, 17 controlling, for example, the reaction temperature and the supply of fuel or other reactants. After analysis, the sample is discharged as indicated at 18.

The analyzer 12, here shown to comprise a pair of cells 12′, 12″, may of course include any number of chambers which, if necessary, could be supplied with gas from hood 7 over a plurality of passages 11. In any case, the path e which the gas sample travels from the filter ribbon to the analyzer should be as short as possible.

Fig. 2 shows a modification of the filtering mechanism, and also a different arrangement of the gas-sampling system. In this embodiment, the filter ribbon 6a is in the form of an endless belt entrained by transport rollers 24′, 24″, 25′ and 25″ (some or all of which are driven, in the direction indicated by the arrows, by a suitable feed mechanism not shown) and supported by the guide rollers 9′, 9″. Instead of coming directly from the flue pipe, as described above, the gas sample enters hood 7 from an opening 4a in a by-pass 13 which communicates at 13′, 13″ with the main flue 3a. For the control of the proportion of gas drawn off through the endless filter belt 6a it is desirable to have a damper 14 in the main duct 3a. By-pass 13 has double walls enclosing an annular space 23a for the circulation of cooling water via inlet 19a′ and 19a″. This arrangement economizes on cooling fluid since only the relatively small amount of gas moving through by-pass 13 needs to be maintained below a certain temperature level. The remaining elements of the system associated with passage 11 have not been shown and may be identical with those of Fig. 1. With filter ribbon 6a rotating invariably in the same direction, both aspirator nozzles 10′, 10″ will operate in series; one of these nozzles could also be omitted.

It will be understood that the endless-belt filter 6a could also be combined with the gas-exhaust system of the preceding embodiment and that, conversely, the filter system shown in Fig. 1 may be used with a by-pass arrangement as illustrated in Fig. 2. Thus, the invention is not limited to the specific embodiments described and illustrated but may be realized in numerous adaptations and modifications without departing from the spirit and scope of the appended claims.

I claim:
1. A system for continuously analyzing hot, dust-laden gases, comprising a duct traversed by said gases, said duct being provided with a jacket for the circulation of a cooling fluid, an analyzer, a passage connecting said duct with said analyzer, a movable dust filter extending across said passage, regenerating means for said filter operatively positioned adjacent said filter beyond said passage, and mechanism for recurrently advancing said filter across said passage and past said regenerating means.

2. A system according to claim 1 wherein said mechanism includes means for periodically reversing the direction of displacement of said filter.

3. A system according to claim 2 wherein said regenerating means comprises two aspirator nozzles positioned adjacent said filter on opposite sides of said passage.

4. A system according to claim 1, further comprising suction means inserted in said passage beyond said analyzer for continuously drawing a portion of said gases through said filter and said analyzer.

5. A system according to claim 1 wherein said duct is provided with a lateral port communicating with said passage, said passage including a conduit having a cross-sectional area substantially smaller than that of said port and a funnel-shaped connection leading from said port to said conduit, said filter being interposed between said port and the broad end of said connection.

6. A system according to claim 5 wherein the ratio of the cross-sectional area of said port to that of said conduit is at least of the order of 20:1.

7. A system according to claim 6 wherein the axial length of said connection is of the order of the width of said conduit.

8. A system according to claim 1 wherein said duct comprises a main flue and a by-pass of reduced cross-sectional area communicating with said main flue, said jacket being provided at said by-pass, said passage extending from said by-pass.

9. A system according to claim 8, further comprising damper means at said main flue for controlling the proportion of said gases passing through said by-pass.

10. A system for continuously analyzing dust-laden gases, comprising a duct traversed by said gases, an analyzer, a passage connecting said duct with said analyzer, said duct being provided with cooling means for said gases at a location ahead of the junction of said duct with said passage, a movable dust filter extending across said passage, a dust aspirator operatively positioned adjacent said filter beyond said passage, and mechanism for recurrently advancing said filter across said passage and past said dust aspirator.

References Cited in the file of this patent
UNITED STATES PATENTS

| 1,982,639 | Christofferson | Dec. 4, 1934 |
| 2,417,321 | Park et al. | Mar. 11, 1947 |
| 2,815,826 | Young | Dec. 10, 1957 |
| 2,817,691 | Hutchins | Dec. 24, 1957 |